No. 741,015. Patented October 13, 1903.

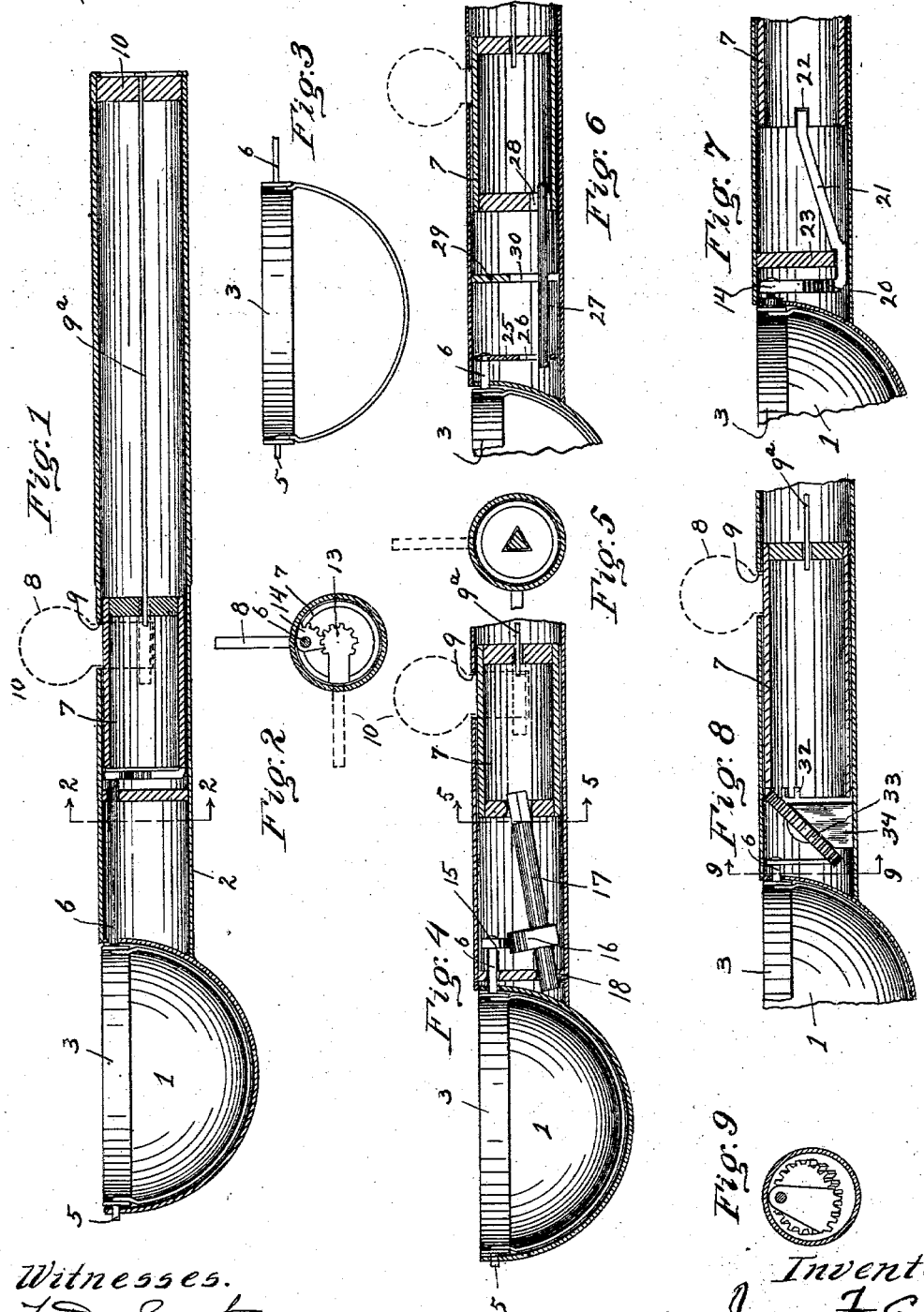
No. 741,015. PATENTED OCT. 13, 1903.
J. F. CRAVEN.
ICE CREAM DIPPER.
APPLICATION FILED FEB. 25, 1903.
NO MODEL.

UNITED STATES PATENT OFFICE.

JAMES F. CRAVEN, OF PITTSBURG, PENNSYLVANIA, ASSIGNOR TO McDOW-ELL MANUFACTURING COMPANY, OF PITTSBURG, PENNSYLVANIA, A CORPORATION OF PENNSYLVANIA.

ICE-CREAM DIPPER.

SPECIFICATION forming part of Letters Patent No. 741,015, dated October 13, 1903.

Application filed February 25, 1903. Serial No. 145,069. (No model.)

*To all whom it may concern:*

Be it known that I, JAMES F. CRAVEN, a resident of Pittsburg, in the county of Allegheny and State of Pennsylvania, have invented a new and useful Improvement in Ice-Cream Dippers; and I do hereby declare the following to be a full, clear, and exact description thereof.

My invention relates to a dipper or disher for ice-cream and the like, and is especially designed for serving ice-cream at soda-fountains and for analogous purposes.

The object of my invention is to provide a dipper or disher for this purpose having means easy and convenient of operation for removing the ice-cream from the bowl of the dipper and having all of the operating mechanism for such means inclosed in a tubular handle, so that the device will not readily foul and can be easily kept clean.

Ice-cream dippers have been heretofore provided with scrapers or cleaners operating in the bowl for removing the ice-cream therefrom. As heretofore constructed the means for operating the scraper or cleaner has been exposed, thus rendering it liable to become foul or clogged with the cream and making it difficult to keep the device clean. Furthermore, the operating means for the scraper or cleaner has been such as to require an unnatural and fatiguing movement of the thumb, thus making the instrument tiresome to use, especially at soda-fountains where a large number of orders must be filled.

The object of my invention is to provide a dipper whereby the foregoing objections are overcome; and to this end it consists of a dipper provided with the usual bowl having therein a scraper or cleaner, together with a tubular handle connected thereto, in which handle all of the operating means between the scraper and the thumb-piece are located, thus protecting the same and preventing the fouling thereof, and also leaving a smooth exterior surface which can be readily cleaned. The invention also consists in making the thumb-piece for operating the stripper movable in a plane at right angles to the axis of the handle and in a direction to utilize the most natural and easy movement of the thumb of the operator and providing connections between said thumb-piece and the scraper, whereby the latter will be rotated in the proper direction for cleaning the bowl, which is opposite to the direction of the natural movement of the thumb.

In the accompanying drawings are shown various arrangements of mechanism for accomplishing the foregoing result.

In the drawings, Figure 1 is a longitudinal section through one form of my device. Fig. 2 is a transverse section through the handle on the line 2 2, Fig. 1. Fig. 3 is a side view of the scraper or cleaner. Fig. 4 is a longitudinal section through a modification. Fig. 5 is a transverse section through the handle of the same on the line 5 5, Fig. 4. Figs. 6, 7, and 8 are longitudinal sections showing other modifications; and Fig. 9 is a transverse section on the line 9 9, Fig. 8.

One of the special features of my invention consists in having the ice-cream dipper provided with a tubular handle, which incloses all of the mechanism for rotating the stripper. This is shown in all modifications of the device wherein the bowl is shown at 1 and is practically semispherical in shape and has secured to one side thereof a comparatively large tubular handle 2, the upper side of which is substantially flush with the upper edge of the bowl. Pivotally mounted in the bowl is a scraper or cleaner 3, the same comprising two bail-shaped members placed substantially at right angles to each other and conforming to the interior of the bowl. Two such bails rather than one are employed, so that a limited rotary movement will scrape the entire interior surface of the bowl. This scraper is pivotally mounted in the bowl on the pivots 5 and 6, which are substantially parallel to the axis of the handle 2. The pivot 6 projects into the handle and is operatively connected with a rotating block or tube 7, mounted in the handle and having connected thereto a thumb-piece 8, projecting through a slot 9 in the side of the handle and movable in a plane at right angles to the axis of said handle. The rotating member 7 preferably is a tube; but it may be a cylindrical block, and in its operation it keeps the slot 9 closed. Secured to said rotating member 7 is one end of a spring 9ᵃ, the opposite end being connected to a disk 10, secured in the outer end of the handle, this spring serving to return the rotating member to its normal position. This spring is shown as a flat spring acting torsionally; but obviously any other kind of spring may be used to accomplish the same result.

Between the rotating member 7 and the pivot 6 of the cleaner are suitable operative connections, which may be of various forms and whereby the rotation of the thumb-piece 8 is communicated to the scraper to remove the ice-cream from the bowl. All of these operative connections, however, are inclosed within the tubular handle, nothing projecting outside of the same except the thumb-piece 8, and even here the arrangement is such that the slot in the handle is kept closed. It will thus be seen that all of the operative mechanism is inclosed and only a smooth practically-unbroken exterior is presented, thus providing a device easy to clean and one in which the mechanism cannot become fouled with the cream or in turn foul the cream.

Another feature of my invention consists in operative connections between the thumb-piece and the scraper 3, so arranged as to permit a movement of the thumb-piece in the natural and easy direction of movement of the thumb, but still such as to rotate the scraper in the desired direction to remove the cream from the bowl. In using devices of this kind one edge of the bowl is used as a scraping edge, and with a right-handed person that edge is the one toward the observer looking at Fig. 1. Consequently the scraper must normally be in the position indicated in said figure—that is, with one of the bails in a horizontal position and the other in a vertical position; but neither of said bails can be in proximity to the scraping edge; otherwise the resistance of the frozen cream would push the scraper back against the tension of the spring and prevent its operation. It is necessary, therefore, that the scraper be not adjacent to the scraping edge. After the bowl has been filled with cream and in emptying it into a dish the dipper is naturally turned upside down, and when held in the right hand the thumb-piece should project out practically horizontally at the left side of the handle, so that a simple downward pressure of the thumb on the thumb-piece will rotate the stripper, this being the natural and least tiresome movement of the thumb. In my device the thumb-piece is so arranged, the normal position of it being in the dotted lines indicated at 10, Figs. 2 and 4. The rotation of the member 7, however, by a simple downward pressure on the thumb-piece is in a direction contrary to which the scrapers must be rotated in order to remove the cream from the bowl. Consequently the operative connections between the rotating member 7 and the scraper will be such as to rotate the latter in a direction contrary to the direction of movement of the thumb-piece. Various mechanisms for this purpose may be used; but in all of them it is necessary to have some member operatively connected to the rotating member 7 and engaging an arm or gear-segment on the pivot 6 of the scraper. In Figs. 1 and 2 this operative connection is shown as a gear-segment 13, carried directly by the rotating member 7 and engaging a similar gear-segment 14 on the extended pivot 6 of the scraper. In Fig. 4 is shown a similar gear-segment 15 on the scraper and engaged by a gear-segment 16, secured to a shaft 17, having one end mounted in a suitable bearing 18 and its other end connected to the rotating member 7, so as to move therewith, this being accomplished by giving the end of the shaft 18 an irregular outline in cross-section, such as shown in Fig. 5, and providing the rotating member 7 with a correspondingly-shaped hole for receiving said shaft end.

In Fig. 7 the gear-segment 20 and connecting-arm on shaft 21 are formed as a single integral piece, the shaft having a broadened flattened end secured in a slot 22 in the rotating member 7, and a suitable bearing 23 being provided for said member to rotate in. The gear-segment 20 engages a corresponding segment 14 on the scraper.

In Fig. 6 the pivot 6 of the scraper has connected thereto an arm 25, provided at its lower end with a slot 26. In this slot is mounted one end of a rocking lever 27, the opposite end of which projects into a slot or opening 28 in the end of the rotating member 7. A disk 29, having a slot 30, provides a suitable fulcrum for this rocking rod, so that the rotation of the member 7 is communicated to the scraper.

In Figs. 8 and 9 the rotating member 7 is provided with gear-teeth 32, which mesh with a small gear or pinion 33, journaled on an inclined bearing 34 and engaging a gear-segment 35, secured to the scraper.

In all forms of my device a gear or similar connection is interposed between the thumb-piece and the scraper, so that the latter will be rotated in a direction contrary to the movement of the thumb-piece, thus rotating the scraper in the right direction and by the natural and least tiresome movement of the thumb of the operator. Various other arrangements of mechanisms for accomplishing this result will suggest themselves, and I do not wish my invention to be limited to the various arrangements shown.

My invention provides an ice-cream dipper whereby the ice-cream can be removed from the bowl by the easiest and most natural movement of the thumb, so that at ice-cream fountains and similar places the operator will not become weary or lame. Furthermore, all of the operating mechanism is inclosed in the tubular handle, and an unbroken smooth exterior only is presented, thus preventing the fouling of the mechanism with the cream and making it much easier to keep the device clean and sightly.

What I claim as my invention, and desire to secure by Letters Patent, is—

1. In a device of the kind described, the combination with a bowl and handle, of a scraper or cleaning device pivotally connected to the bowl on an axis in alinement with the handle, a thumb-piece projecting from the handle and movable in a plane at right angles to the axis thereof, and connections between the thumb-piece and scraper for rotating the latter in a direction opposite to the movement of the thumb-piece.

2. In a device of the kind described, the combination with a bowl and handle, of a scraper or cleaning device pivotally connected to the bowl on an axis in alinement with the handle, a thumb-piece movable in a plane at right angles to the axis of the handle, an operating member connected to the thumb-piece, a journal or fulcrum-bearing therefor, and connections between said operating member and the scraper whereby the latter will be rotated in a direction opposite to the movement of the thumb-piece.

3. In a device of the kind described, the combination with a bowl and handle, of a scraper or cleaning device pivotally connected to the bowl on an axis in alinement with the handle, a thumb-piece projecting from the handle and movable in a plane at right angles to the axis thereof, a toothed member operatively connected to the thumb-piece to be rotated thereby, and a coöperating toothed member connected to the scraper.

4. In a device of the kind described, the combination with a bowl and handle, of a scraper or cleaning device pivotally connected to the bowl on an axis in alinement with the handle, a thumb-piece movable in a plane at right angles to the axis of the handle, a rotary member operated by said thumb-piece, a gear-segment carried by said rotary member, and a coöperating gear-segment connected to the scraper.

5. In a device of the kind described, the combination with a substantially semispherical bowl, of a large tubular handle connected thereto with its top substantially flush with the top of the bowl, a scraper pivotally connected to the bowl on an axis in alinement with the handle, a thumb-piece projecting through a slot in the handle and movable in a plane at right angles to the axis thereof, and operative means located in the tubular handle and connecting the thumb-piece and scraper and arranged to rotate the latter in a direction opposite to the movement of the thumb-piece.

In testimony whereof I, the said JAMES F. CRAVEN, have hereunto set my hand.

JAMES F. CRAVEN.

Witnesses:
F. W. WINTER,
ROBERT C. TOTTEN.